(12) United States Patent
Schreiber et al.

(10) Patent No.: US 11,106,213 B2
(45) Date of Patent: Aug. 31, 2021

(54) METHOD FOR ASSISTING BAY PARKING MANEUVERS OF A VEHICLE AND A PARKING ASSISTANT FOR A VEHICLE

(71) Applicants: HYUNDAI MOTOR COMPANY, Seoul (KR); KIA MOTORS CORPORATION, Seoul (KR)

(72) Inventors: Michael Schreiber, Frankfurt am Main (DE); Ingmar Langer, Darmstadt (DE); Peter Keller, Wiesbaden (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 250 days.

(21) Appl. No.: 16/282,845

(22) Filed: Feb. 22, 2019

(65) Prior Publication Data

US 2020/0150675 A1 May 14, 2020

(30) Foreign Application Priority Data

Nov. 13, 2018 (DE) .......................... 102018219308.8

(51) Int. Cl.
G05D 1/02 (2020.01)
G08G 1/14 (2006.01)

(52) U.S. Cl.
CPC ........... *G05D 1/0225* (2013.01); *G08G 1/146* (2013.01); *G05D 2201/0213* (2013.01)

(58) Field of Classification Search
CPC ......... G05D 1/0225; G05D 2201/0213; G08G 1/146; B62D 15/028; B62D 15/0285

(Continued)

(56) References Cited

U.S. PATENT DOCUMENTS

2007/0282489 A1* 12/2007 Boss .................. B62D 15/0285
  701/2
2010/0049402 A1* 2/2010 Tanaka ...................... B60R 1/00
  701/41

(Continued)

FOREIGN PATENT DOCUMENTS

DE 102014013692 3/2016
DE 102015016805 7/2016

(Continued)

*Primary Examiner* — Jonathan M Dager
*Assistant Examiner* — Jean W Charleston
(74) *Attorney, Agent, or Firm* — Lempia Summerfield Katz LLC

(57) ABSTRACT

A method for assisting bay parking maneuvers of a vehicle includes locating, by a sensor system of the vehicle, an unoccupied parking space in a bay parking area. The method includes acquiring, by the sensor system, parking data on the unoccupied parking space, the parking data including information on positions of vehicles parking laterally adjacent to the unoccupied parking space in the bay parking area. The method includes deciding, by a decision unit of the vehicle, based on the parking data, if the vehicle fits into the unoccupied parking space side-to-side with at least one of the other vehicles, wherein a predefined lateral clearance is taken into account on both lateral sides of the vehicle. The method includes providing, by a steering assistant unit of the vehicle, steering instructions for steering the vehicle into the unoccupied parking space adjacent to the respective parking vehicle in observance with the predefined lateral clearance.

14 Claims, 4 Drawing Sheets

(58) Field of Classification Search
USPC .......................................................... 701/71
See application file for complete search history.

(56) References Cited

U.S. PATENT DOCUMENTS

| | | | | |
|---|---|---|---|---|
| 2011/0082613 | A1* | 4/2011 | Oetiker | B62D 15/0285 |
| | | | | 701/25 |
| 2011/0093168 | A1* | 4/2011 | Barth | G08G 1/16 |
| | | | | 701/41 |
| 2013/0073119 | A1* | 3/2013 | Huger | B62D 15/027 |
| | | | | 701/1 |
| 2013/0096816 | A1* | 4/2013 | Takano | B62D 15/0275 |
| | | | | 701/400 |
| 2014/0292542 | A1* | 10/2014 | Bruning | B62D 15/028 |
| | | | | 340/932.2 |
| 2016/0075326 | A1* | 3/2016 | Kiyokawa | B60W 30/06 |
| | | | | 701/41 |
| 2018/0334189 | A1* | 11/2018 | Benmimoun | B62D 15/0285 |

FOREIGN PATENT DOCUMENTS

| | | |
|---|---|---|
| EP | 2807065 | 7/2016 |
| JP | 2007181975 | 7/2000 |
| WO | 2013110479 | 8/2013 |

* cited by examiner

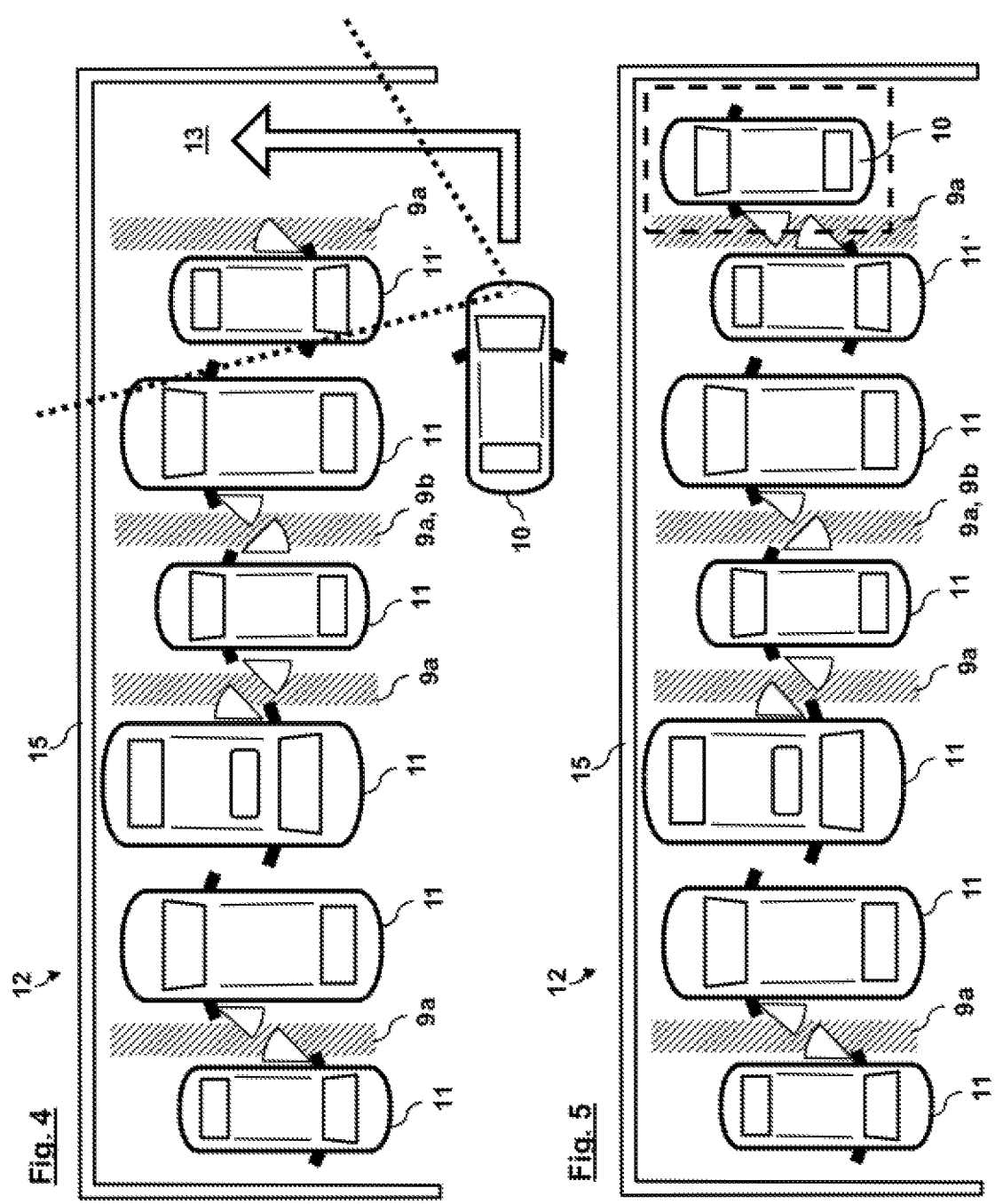

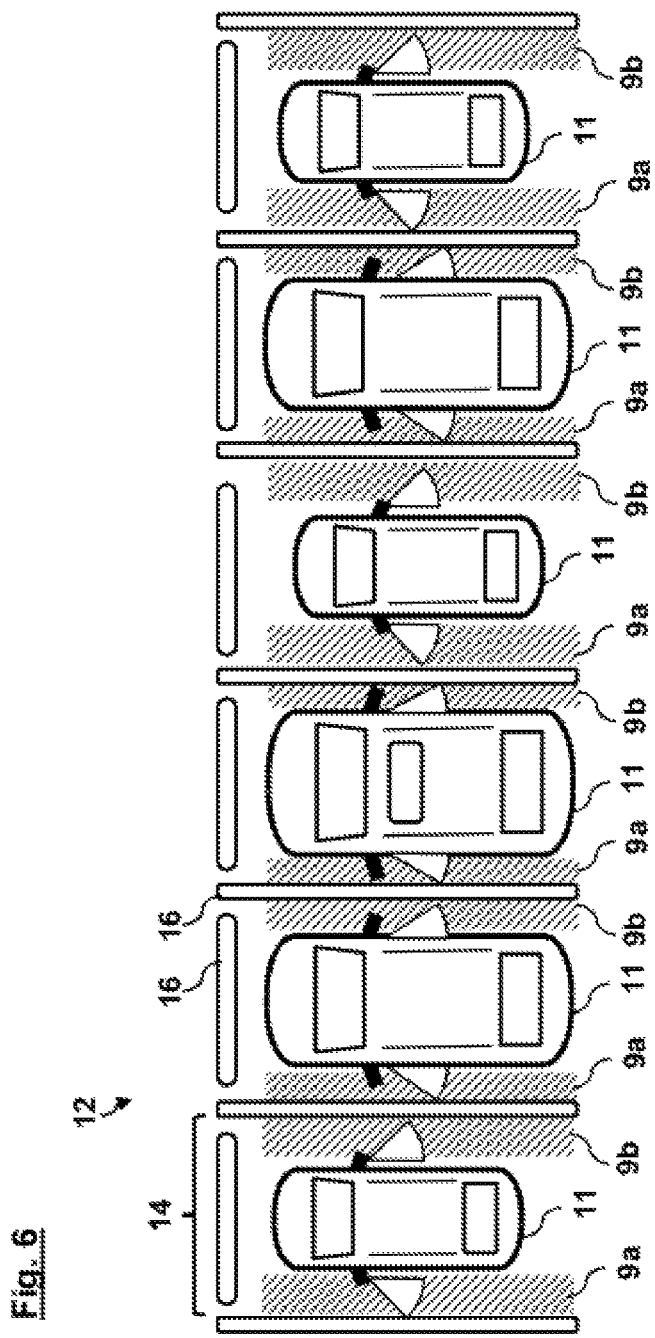

METHOD FOR ASSISTING BAY PARKING MANEUVERS OF A VEHICLE AND A PARKING ASSISTANT FOR A VEHICLE

CROSS REFERENCE TO RELATED APPLICATION

The present application claims priority to and the benefit of German Patent Application No. 102018219308.8, filed Nov. 13, 2018, the entire contents of which are incorporated herein for all purposes by this reference.

BACKGROUND

1. Technical Field

The present disclosure pertains to a method for assisting bay parking maneuvers of a vehicle, and more particularly to a motor vehicle, a parking assistant for a vehicle, and a vehicle with such a parking assistant.

2. Description of Related Art

Current vehicles are increasingly connected with sensors and telematics in order to implement advanced driver-assistance systems and/or autonomous driving functionalities. For example, cars may be provided with multiple sensors and various techniques for acquiring data from the environment, such as to provide accurate detection of other vehicles, pedestrians, of the road ahead and/or behind, of the weather, and the like. Typical technologies that are utilized for this purpose include radar, laser, lidar, infrared, ultrasound, cameras, stereo vision, computer vision, odometry, accelerometers, gyroscopes, GPS, and the like. To produce a more consistent, accurate, and useful view of the environment, a variety of such sensors may be provided on a car and the information from these sensors may be combined within a sensor system.

In cities, parking space is often severely limited. Space limitations are sometimes even intensified as the available parking space may not be used in an optimal and efficient way. Many of the available parking areas and/or parking lots are arranged and configured for perpendicular parking and/or angle parking, also known as bay parking, wherein vehicles are parked side to side and perpendicular and/or at an angle to an aisle, curb, wall, and/or the like. In these parking lots, boundaries of individual parking bays are usually defined by road surface markings like lines, arrows, and/or hatched areas or similar. However, cars and other vehicles are manufactured in a vast spectrum of different widths and lengths, which makes it difficult to conceive suitable markings that make optimal use of the available space.

Document DE 10 2014 013 692 A1 describes a method and a driver assistance device for performing an automatic parking operation of a vehicle. The document discloses that parking operation is interrupted if there is not enough space in a target position to leave the vehicle.

Document DE 10 2015 016 805 A1 describes a method for specifying an optimized parking position of a vehicle in a parking space in response to occupants in the interior of the vehicle and spatial conditions of the parking space. A vehicle occupant is able to choose one of several parking positions, which is then realized by an autonomous parking process.

Document EP 2 807 065 B1 describes a method for driving assistance and a driving assistance system of a vehicle. The document discloses that a driver may choose one of several parking alternatives, which allow the driver and/or other occupants to comfortably exit/enter the vehicle. Available space on a passenger side of the vehicle may be set larger or smaller depending on seat occupancy.

SUMMARY

Hence, there is a need to find solutions for using parking space more efficiently.

To this end, the present disclosure provides a method, a parking assistant, and a vehicle according to the teachings of the present disclosure.

According to one aspect of the present disclosure, a method for assisting bay parking maneuvers of a vehicle includes locating, by a sensor system of the vehicle, an unoccupied parking space in a bay parking area. The method includes acquiring, by the sensor system, parking data on the unoccupied parking space, the parking data including information on positions of vehicles parked or parking laterally adjacent to the unoccupied parking space in the bay parking area. The method includes deciding, by a decision unit of the vehicle, based on the parking data, if the vehicle fits into the unoccupied parking space side-to-side with at least one of the parking vehicles, wherein a predefined lateral clearance is taken into account on both lateral sides of the vehicle. The method includes providing, by a steering assistant unit of the vehicle, steering instructions for steering the vehicle into the unoccupied parking space adjacent to the respective parking vehicle in observance with the predefined lateral clearance.

According to another aspect of the present disclosure, a parking assistant for assisting bay parking maneuvers of a vehicle includes a sensor system configured to locate an unoccupied parking space in a bay parking area and to acquire parking data on the unoccupied parking space, the parking data including information on positions of vehicles parked or parking laterally adjacent to the unoccupied parking space in the bay parking area. The parking assistant includes a decision unit configured to decide, based on the parking data, if the vehicle fits into the unoccupied parking space side-to-side with at least one of the other parked or parking vehicles, wherein a predefined lateral clearance is taken into account on both lateral sides of the vehicle. The parking assistant includes a steering assistant unit configured to provide steering instructions for steering the vehicle into the unoccupied parking space adjacent to the respective parked or parking vehicle or vehicles in observance with the predefined lateral clearance.

According to yet another aspect of the disclosure, a vehicle comprises a parking assistant according to the teachings of the present disclosure.

One aspect of the present disclosure is to provide each vehicle with the parking space it really requires without limiting the available parking space to a fixed parking boundary as preset by road surface markings or the like. In particular, a predefined width of a single parking slot and/or parking bay is no longer used. Instead, vehicles are parked side-to-side as close as possible, with each vehicle only taking up the amount of parking space it needs. This includes a lateral clearance on a driver side and on a co-driver or passenger side of the vehicle, both of which are predefined for each vehicle and provide appropriate exit space for occupants to comfortably enter and/or exit the vehicle. For example, the lateral clearance may be fixed on both sides of the vehicle based on the type of the vehicle, the size of the vehicle, the number of occupants, and/or the like. Moreover, the lateral clearance may be the same or different on the driver-side and on the co-driver side. The lateral clearance can be chosen so as to provide minimal and/or optimal egress/ingress area for the occupants.

As a consequence, the parking system according to the present disclosure makes use of existing parking space in a much more efficient way than conventional parking approaches in that, generally, more cars can be parked on or within the same space. Furthermore, the present disclosure ensures that there is always sufficient space left to exit and/or enter the vehicle.

It should be understood that the term "vehicle" or "vehicular" or other similar term as used herein is inclusive of motor vehicles in general, such as passenger automobiles including sports utility vehicles (SUV), buses, trucks, various commercial vehicles, and the like. Such terms also include hybrid vehicles, electric vehicles, plugin hybrid electric vehicles, hydrogen-powered vehicles, and other alternative fuel vehicles (such as fuels derived from resources other than petroleum). As referred to herein, a hybrid vehicle is a vehicle that has two or more sources of power, such as, for example, both gasoline-powered and electric-powered vehicles.

Bay parking areas within the meaning of the present disclosure include parking areas and/or parking lots for perpendicular parking and/or angled parking. In such bay parking areas, vehicles are parked side to side and perpendicular to an aisle, curb, wall, or the like and/or at an angle to the respective structure, i.e. at an acute angle with a direction of approach.

Advantageous embodiments and improvements of the present disclosure are found in the subordinate claims.

According to an embodiment of the present disclosure, the method may further include determining, by a determination unit of the vehicle, if at least one seat on a co-driver or passenger side of the vehicle is occupied. The method may further include setting the predefined lateral clearance on the co-driver side of the vehicle to a minimal clearance in case no seat is occupied on the co-driver side. Correspondingly, the determination unit may be configured to determine if at least one seat on a co-driver side of the vehicle is occupied.

Thus, the seat occupancy of the vehicle may be taken into account as a parameter for defining the lateral clearance of the vehicle. If only seats on the driver side of the vehicle are occupied, then no egress area on the co-driver or passenger side may be needed. Hence, the co-driver-side lateral clearance may be set to a minimal value, such as a value significantly smaller than for the driver-side lateral clearance, or even zero in an extreme case, such that the lateral distance to another vehicle and/or a parking space boundary may be as small as possible.

According to an embodiment of the present disclosure, the parking data may further include information on the orientations of the parked or parking vehicles, i.e., surrounding vehicles that are either parked or in the process of parking. The steering instructions may include instructions on parking the vehicle in reverse orientation to the respective parked or parking vehicle or vehicles.

Hence, the orientation of parked or parking vehicles is another parameter that may be considered in the lateral clearance definition. For example, all vehicles may be parked in an alternating order to improve parking space. This makes it possible to park vehicles much closer to each other in case there are no occupants on the co-driver or passenger side of the vehicle. In that case, no space for persons to exit/enter on the co-driver side has to be reserved so that vehicles may share the egress/ingress area pairwise provided by the lateral clearance on the driver side of the vehicle, while the distance between each pair of vehicles may be reduced to a minimum.

According to an embodiment of the present disclosure, the sensor system may acquire information on the orientations of the parked or parking vehicles by detecting structures and/or surface patterns on the parked or parking vehicles. The sensor system may particularly acquire information on the orientations of the parked or parking vehicles by detecting structures and/or surface patterns on the license plates of the parked or parking vehicles. Correspondingly, the sensor system may be configured to acquire information on the orientations of the parked or parking vehicles by detecting structures and/or surface patterns on the parked or parking vehicles, in particular on the license plates of the parked or parking vehicles.

Current vehicle technology and sensors may be used for the present disclosure. For example, radar sensors, lidar sensors and/or ultrasonic sensors may be used for position detection of other vehicles. For orientation detection cameras may be utilized that are installed on or in the vehicle. To this end, the sensor data may be analyzed with a suitable pattern recognition and/or object reconstruction/identification algorithm. In one particular example, the sensor system may be configured to scan the license plates of the other parked or parking vehicles and analyze them for unique features that distinguish between front side and back side of a vehicle, such as by. plate color, specific inspection tags, and the like. However, additionally or alternatively, positions and orientations of other parked or parking vehicles may also be exchanged via vehicle-to-vehicle communication, such as a wireless communication network.

According to an embodiment of the present disclosure, the method may further include determining, by the determination unit, body dimensions of the driver and/or of further occupants. The method may further include adapting the predefined lateral clearance on the respective lateral sides of the vehicle to the determined body dimensions of the occupants. Correspondingly, the determination unit may be configured to determine body dimensions of the driver and/or of further occupants.

Hence, occupant body dimensions may be used as a further parameter to provide an optimal exit/entry space for the vehicle. Various indicators for the body dimensions, proportions, corpulence, and/or the size of an occupant may be used like, for example, physical dimensions, weight, body mass index, and the like. Thus, a larger lateral clearance may be defined if the driver and/or other occupants have relatively large body proportions and/or are relatively corpulent.

According to an embodiment of the present disclosure, the sensor system may determine an outer appearance of the respective occupant, a weight of the respective occupant, and/or a roll-out length of a safety belt used by the respective occupant. On this basis, the body dimensions may be determined by the determination unit. Correspondingly, the sensor system may be configured to determine an outer appearance of the respective occupant, a weight of the respective occupant, and/or a roll-out length of a safety belt used by the respective occupant.

For example, a seat detection sensor may measure the weight of a driver and/or another occupant. In another example, the roll-out length of a safety/seat belt may be measured by a corresponding sensor of the respective seat. As the roll-out of such a belt is larger for more corpulent persons, for example, the roll-out length may be used as an indicator for the weight and/or body proportions of the occupant. The respective lateral clearance may be adapted accordingly. In one example, the lateral clearance may be increased with increasing body proportions, weight, size, corpulence, and the like.

According to an embodiment of the present disclosure, the method may further include parking the vehicle by an assisted/autonomous driving unit of the vehicle following the steering instructions. Correspondingly, an assisted/autonomous driving unit may be configured to park the vehicle following the steering instructions.

The disclosed method, parking assistant, and/or vehicle may generally be used for manual, assisted and/or autonomous parking. In the case of autonomous parking, the vehicle may select the trajectory for the parking maneuver on its own, such as via the assisted/autonomous driving unit. The parking may then be executed without any intervention by the driver. The sensor system, vehicle-to-vehicle communication, and/or vehicle-to-environment communication may provide the required parking data. In the case of assisted parking, the vehicle may select the trajectory for the parking maneuver by itself (such as through no influence of the driver on lateral control). However, the driver may be required to operate the accelerator pedal. As for autonomous parking, the sensor system, vehicle-to-vehicle communication, and/or vehicle-to-environment communication may provide the required parking data. Finally, in the case of manual parking, the vehicle may merely suggest, via the steering assistant unit and/or a driver interface, steering recommendations for the driver. However, the driver will have to handle the maneuver itself and guide the vehicle into the parking position, such as by following the steering recommendations of the vehicle. As for autonomous and/or assisted parking, the sensor system, vehicle-to-vehicle communication, and/or vehicle-to-environment communication may provide the required parking data.

The disclosed method, parking assistant, and vehicle are explained in greater detail with reference to embodiments depicted in the accompanying drawings.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and, together with the written description, serve to explain the principles of the disclosed method, parking assistant, and vehicle. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

FIGS. 4 and 5 depict an example for a parking maneuver, which is performed using the parking assistant of FIG. 1.

FIG. 6 shows an example for a bay parking area with conventionally parked vehicles.

Although specific embodiments are illustrated and described herein, it should be appreciated by those of ordinary skill in the art that a variety of alternate and/or equivalent implementations may be substituted for the specific embodiments shown and described herein without departing from the scope of the present disclosure. Generally, this disclosure is intended to cover any adaptations or variations of the specific embodiments discussed herein.

DETAILED DESCRIPTION OF THE EMBODIMENTS

Figure 1:
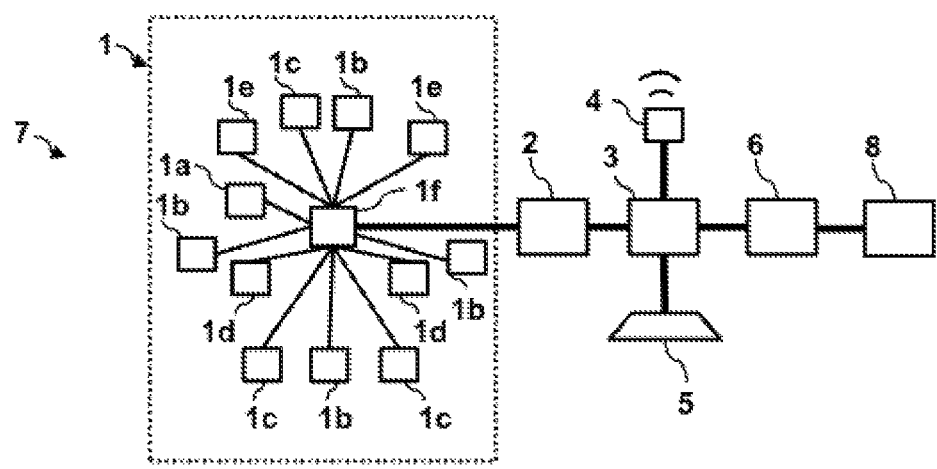
FIG. 1 schematically depicts a parking assistant according to an embodiment of the present disclosure.
Figure 2:
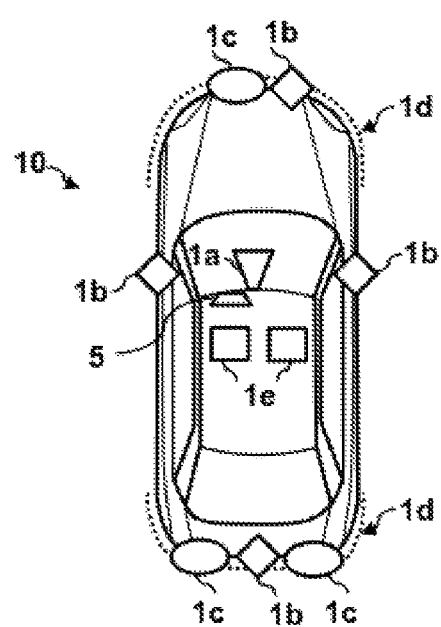
FIG. 2 schematically shows a vehicle comprising the parking assistant of FIG. 1.
Figure 3:
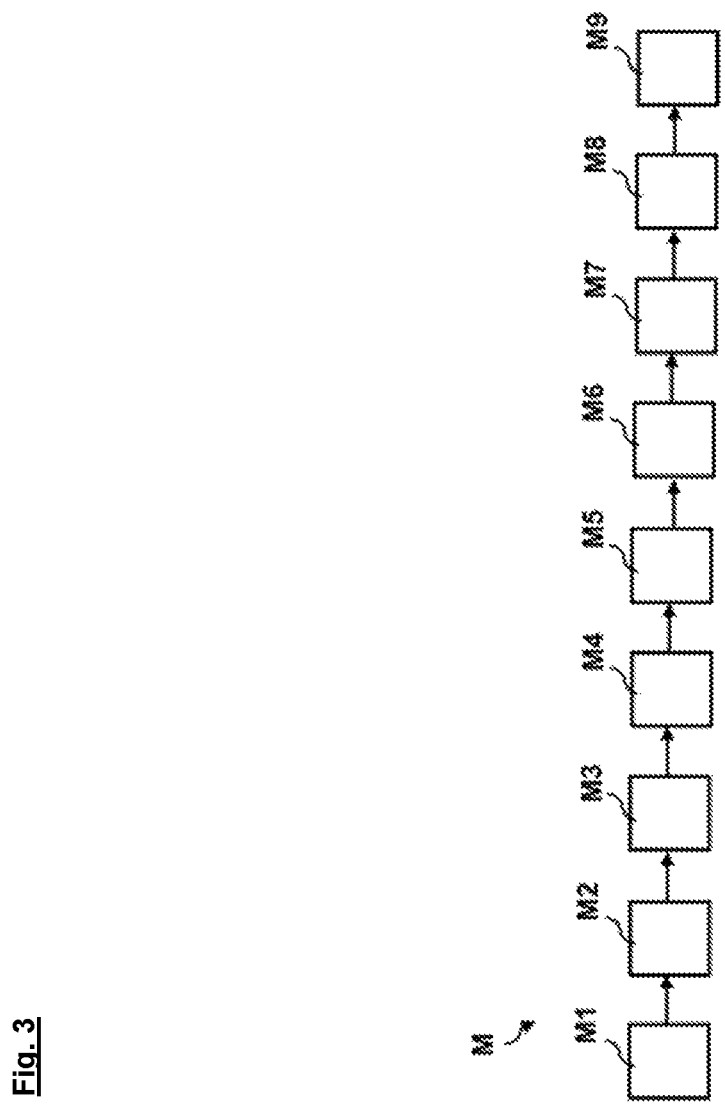
FIG. 3 shows a flow diagram of a method for assisting bay parking maneuvers of the vehicle of FIG. 2 using the parking assistant of FIG. 1.

FIG. 1 schematically depicts a parking assistant 7 according to an embodiment of the disclosure. FIG. 2 shows a vehicle 10 comprising the parking assistant 7 of FIG. 1. The parking assistant 7 assists the vehicle 10 during bay parking maneuvers or parking maneuvers in parallel parking areas or so-called bay parking areas. Vehicles are parked side to side, perpendicular to an aisle, curb, or wall, or the like in such bay parking areas. FIG. 3 shows a flow diagram of a method M for assisting bay parking maneuvers of the vehicle 10 of FIG. 2 using the parking assistant 7 of FIG. 1.

The control system 7 of the vehicle 10, such as a car, comprises a sensor system 1, which is configured to locate an unoccupied parking space 13 in a bay parking area 12 and to acquire parking data on the unoccupied parking space 13. FIGS. 4 and 5 depict an example for a parking maneuver, which is performed in a bay parking area 12 using the parking assistant of FIG. 1. The parking data may include any information relevant to park the vehicle 10 in the unoccupied parking space 13 and may comprise, amongst others, information on positions and orientations of vehicles 11, 11' that are parked or in the process of parking laterally adjacent to the unoccupied parking space 13 in the bay parking area 12. Consequently, the sensor system 1 may further be configured to acquire information on the orientations of the parked or parking vehicles 11, 11' by detecting structures and/or surface patterns on the parked or parking vehicles 11, 11'. For example, the sensor system 1 may be particularly configured to determine the orientations of the vehicles 11, 11' by detecting structures and/or surface patterns on the license plates of the parking vehicles 11, 11'.

To this end, the sensor system 1 comprises a variety of different sensor technologies as they are utilized in modern vehicles such as, in particular, in assisted and/or autonomous driving systems. The particular example of a sensor system 1 shown in FIGS. 1 and 2 comprises a front camera 1a and a 360°-view camera system comprising several individual cameras 1b arranged at several positions over the vehicle 10. The sensor system 1 further comprises several radar devices 1c, such as short-range and/or long-range radar devices, as well as ultrasonic sensors 1d. However, the person of ordinary skill in the art may provide the vehicle 10 with other sensors depending on the particular application. Furthermore, different sensor technologies and arrangements may be employed, such as lidar devices, laser scanners, and the like.

The parking system 7 further comprises a determination unit 2 configured to determine if at least one seat on a co-driver or passenger side of the vehicle 10 is occupied. To this end, the determination unit 2 is coupled with the sensor system 1 and configured to analyze information recorded by the sensor system 1. The sensor system 1 further comprises occupancy sensors 1e that are configured to detect occupants of the seats of the vehicle 10. The occupancy sensors 1e may comprise, for example, weight sensors, motion detectors, optical sensors, and the like. The various sensors 1a-1e are communicatively connected (for example connected in parallel) to a sensor control 1f of the sensor system 1. The sensor system 1 in turn is communicatively connected with the determination unit 2 and the further components. The depicted connections are to be understood in a purely schematic way.

The parking data may be complemented and/or substituted by data provided via a communication device 4 of the parking system 7, which may be communicatively coupled to the determination unit 2 and the other components of the parking system 7. The communication device 4 may be further used to communicate with other vehicles and/or the environment in order to request and/or receive information on parked or parking vehicles, availability of parking slots in the bay parking area 12, and the like.

The parking system 7 further comprises a decision unit 3 configured to determine or decide, based on the parking data, if the vehicle 10 fits into the unoccupied parking space 13 side-to-side with one of the other parked or parking vehicles 11' (see FIG. 4 in particular). For this, a predefined lateral clearance 9a, 9b is taken into account on both lateral sides of the vehicle 10, i.e. a driver-side lateral clearance 9a on a driver side of the vehicle 10 and a co-driver-side or passenger side lateral clearance 9b on a co-driver side of the vehicle 10. However, in the case where no seat is occupied on the co-driver side, then the predefined lateral clearance 9b on the co-driver side of the vehicle 10 is set to a minimal clearance, such as a minimal safety distance to adjacent vehicles and/or objects. In the latter case, the minimal safety distance may be negligible compared to the lateral clearances 9a, 9b in the case of occupied seats. Thus, the co-driver-side or passenger side lateral clearance 9b is only indicated in FIG. 4 for vehicles 11, 11' with occupied seat(s) on the co-driver side.

The examples described herein are based on right-hand traffic, thus assuming that the driver side corresponds to the left side of vehicles. However, as will be clear to the person of ordinary skill in the art, the disclosure may equally well be applied to a left-hand traffic situation, in which the driver side corresponds to the right side of vehicles, and/or mixed applications with both types of vehicles.

The parking system 7 further comprises a steering assistant unit 6 configured to provide steering instructions for steering the vehicle 10 into the unoccupied parking space 13 adjacent to the respective parked vehicle 11' while observing the predefined lateral clearance 9a, 9b. In the specific example of FIGS. 1 to 5, the vehicle 10 is configured as an assisted/autonomous vehicle, which further has an assisted/autonomous driving unit 8 configured to park the vehicle 10 following the steering instructions. However, in other embodiments, the vehicle 10 may be configured as a manual vehicle, which is manually steered into the parking position by the driver. In that case, the steering assistant unit 6 may merely provide steering recommendations to the driver. In the case of assisted driving, the assisted/autonomous driving unit 8 manages the parking maneuver completely on its own. In assisted driving, the assisted/autonomous driving unit 8 may steer the vehicle 10 into the parking position based on the steering instructions of the steering assistant unit 6. However, the driver may still need to operate a control device, such as an accelerator pedal or the like.

The parking system 7 further comprises a driver interface 5, which may include a display or the like, which is configured to display relevant information for the driver. In particular, the driver interface 5 may be configured to display the steering instructions of the steering assistant unit 6 and to receive input from the driver, such as in the case where the driver wants to take over control of the vehicle 10. The determination unit 2, the decision unit 3, the communication device 4, the steering assistant unit 6, the assisted/autonomous driving unit 8, as well as the other components of the parking system 7 may be part of a telematics and/or computing system of the vehicle 10 for autonomous driving.

Furthermore, the determination unit 2 is configured to determine body dimensions of the driver and/or of further occupants. To this end, the sensor system 1 is configured to determine an outer appearance of the respective occupant, a weight of the respective occupant, and/or a roll-out length of a safety belt used by the respective occupant, based on which the body dimensions are determined by the determination unit 2. The predefined lateral clearance 9a, 9b is then adapted on the respective lateral sides of the vehicle 10 to the determined body dimensions of the occupants. For example, the respective lateral clearance 9a, 9b may be increased with increasing body size and/or weight of the respective occupant.

FIGS. 4 and 5 depict an example for a parking method M, which is performed in the bay parking area 12 using the parking assistant 7 of FIG. 1. With reference to FIG. 3, the method M comprises under M1 locating, by the sensor system 1, an unoccupied parking space 13 in the bay parking area 12. The method further comprises under M2 acquiring, by the sensor system 1, parking data on the unoccupied parking space 13. The method M further comprises under M3 determining, by the determination unit 2, if at least one seat on a co-driver side or passenger side of the vehicle 10 is occupied. The method M further comprises under M4 setting the predefined lateral clearance 9b on the co-driver side or passenger side of the vehicle 10 to a minimal clearance in case no seat is occupied on the co-driver side. The method M further comprises under M5 determining, by the determination unit 2, body dimensions of the driver and/or of further occupants. The method M further comprises under M6 adapting the predefined lateral clearance 9a, 9b on the respective lateral sides of the vehicle 10 to the determined body dimensions of the occupants. The method M further comprises under M7 determining or deciding, by the decision unit 3, based on the parking data, if the vehicle 10 fits into the unoccupied parking space 13 side-to-side with one of the parked or parking vehicles 11'. The predefined lateral clearance 9a, 9b is taken into account on both lateral sides of the vehicle 10. The method M further comprises under M8 providing, by the steering assistant unit 6, steering instructions for steering the vehicle 10 into the unoccupied parking space 13 adjacent to the respective parked or parking vehicle 11' while observing or accounting for the predefined lateral clearance 9a, 9b. The method M further comprises under M9 parking the vehicle 10 by the assisted/autonomous driving unit 8 of the vehicle 10 following the steering instructions.

As can be seen in FIGS. 4 and 5, seven cars fit into the bay parking area 12. Parking efficiency is optimized by letting the cars share their driver exit/entrance areas pairwise (i.e. the co-driver side or passenger side can be parked closer, as the co-driver-side lateral clearance is minimized in the case where only the driver side is occupied). This is schematically illustrated in FIGS. 4 and 5 by the fact that only the driver-side lateral clearance 9a has a visible size, while the co-driver-side lateral clearance 9b is negligible, i.e. only a minimal maneuvering space is left between the vehicles on the co-driver side. The parking efficiency is further optimized because the distances between vehicles are fixed by the individual sizes of the vehicles (as well as the predefined lateral clearances). This means that less parking space is occupied by narrow or small cars. If individual cars should need more egress/ingress space, such as due to large doors, then the predefined lateral clearance of these particular cars may take that into account. Dedicated road surface markings or other signs indicating individual parking slots and/or parking bays are not required in this case as the vehicles choose an optimal parking position and orientation by themselves. Also, an outer border 15 for the whole bay parking area 12 may be determined, for example, by surrounding walls, curbstones, tress, buildings, and/or markings.

In contrast, FIG. 6 shows an example of a bay parking area 12 with conventionally parked vehicles 11, each of which occupies a single parking bay 14, the size of which is predefined by parking bay boundaries 16 using road surface markings and/or curbstones and the like. As can be seen, only six vehicles 11 fit into the bay parking area 12 of FIG. 6 in contrast to the seven vehicles fitting into the bay parking area 12 of FIGS. 4 and 5 despite the fact that both bay parking areas 12 have the same size. However, due to the smart parking approach followed in the embodiment of FIGS. 4 and 5, including alternating orientations of the vehicles and reduced lateral clearances on the co-driver side or passenger (in cases where the respective seats are unoccupied) an additional seventh vehicle 10 fits into the available parking area.

In the foregoing detailed description, various features are grouped together in one or more examples with the purpose of streamlining the disclosure. It is to be understood that the above description is intended to be illustrative, and not restrictive. It is intended to cover all alternatives, modifications, and equivalents. Many other examples will be apparent to one of ordinary skill in the art upon reviewing the above specification.

The embodiments were chosen and described in order to best explain the principles of the disclosure and its practical applications, to thereby enable others of ordinary skill in the art to best utilize the disclosure and various embodiments with various modifications, as are suited to the particular use contemplated. Many other examples will be apparent to one of ordinary skill in the art upon reviewing the above specification.

REFERENCE LIST

1 sensor system
1a, 1b camera
1c radar device
1d ultrasonic sensor
1e occupancy sensor
1f sensor control
2 determination unit
3 decision unit
4 communication device
5 driver interface
6 steering assistant unit
7 parking assistant
8 assisted/autonomous driving unit
9a, 9b lateral clearance
9a driver-side lateral clearance
9b co-driver-side lateral clearance
10 vehicle
11, 11' parked or parking vehicle
12 bay parking area
13 unoccupied parking space
14 parking bay
15 parking area outer border
16 parking bay boundary
M method
M1-M9 method steps

The invention claimed is:

1. A method for assisting bay parking maneuvers of a vehicle, the method comprising:
   locating, by a sensor system of the vehicle, an unoccupied parking space in a bay parking area;
   acquiring, by the sensor system, parking data on the unoccupied parking space, the parking data including information on positions of vehicles parked or parking laterally adjacent to the unoccupied parking space in the bay parking area;
   deciding, by a telematics system of the vehicle, based on the parking data, whether the vehicle fits into the unoccupied parking space side-to-side with at least one of the laterally adjacent parked or parking vehicles, wherein a predefined lateral clearance is taken into account on both lateral sides of the vehicle;
   providing, by the telematics system of the vehicle, steering instructions for steering the vehicle into the unoccupied parking space adjacent to the respective parking vehicle while accounting for the predefined lateral clearance;
   determining, by the telematics system of the vehicle, whether at least one seat on a passenger side of the vehicle is occupied;
   setting the predefined lateral clearance on the passenger side of the vehicle to a minimal clearance when no seat is occupied on the passenger side;
   determining, by the telematics system, body dimensions of a driver and/or of further occupants of the vehicle; and
   adapting the predefined lateral clearance on the respective lateral sides of the vehicle to the determined body dimensions of the driver and/or the further occupants.

2. The method according to claim 1, wherein the parking data further includes information on the orientations of the laterally adjacent parked or parking vehicles, and wherein the steering instructions include instructions on parking the vehicle in reverse orientation to the respective laterally adjacent parked or parking vehicles.

3. The method according to claim 1, wherein the parking data further includes information on the orientations of the laterally adjacent parked or parking vehicles, and wherein the steering instructions include instructions on parking the vehicle in reverse orientation to the respective laterally adjacent parked or parking vehicles.

4. The method according to claim 3, wherein the sensor system acquires information on the orientations of the laterally adjacent parked or parking vehicles by detecting structures and/or surface patterns thereon.

5. The method according to claim 1, wherein the sensor system determines at least one of an outer appearance of, a weight of, and a roll-out length of a safety belt used by the driver and/or the further occupants, based on which the body dimensions are determined by the telematics system.

6. The method according to claim 1, further comprising:
   parking the vehicle by an assisted/autonomous driving unit of the vehicle following the steering instructions.

7. A parking assistant for assisting bay parking maneuvers of a vehicle, the parking assistant comprising:
   a sensor system configured to locate an unoccupied parking space in a bay parking area and to acquire parking data on the unoccupied parking space, the parking data including information on positions of other vehicles parked or parking laterally adjacent to the unoccupied parking space in the bay parking area; and a telematics system configured to decide, based on the parking data, whether the vehicle fits into the unoccupied parking space side-to-side with at least one vehicle of the other vehicles, wherein a predefined lateral clearance is taken into account on both lateral sides of the vehicle, wherein the telematics system is further configured to provide steering instructions for steering the vehicle into the unoccupied parking space adjacent to the at least one other vehicle and accounting for the predefined lateral clearance, wherein the telematics system is further configured to determine whether at least one seat on a passenger side of the vehicle is occupied, wherein the predefined lateral clearance on the passenger side of the vehicle is set to a minimal clearance when no seat is occupied on the passenger side, wherein the telematics system is further configured to determine body dimensions of the driver and/or of further occupants of the vehicle, and wherein the predefined lateral clearance is adapted on the respective lateral sides of the vehicle to the determined body dimensions of the driver and/or the further occupants.

8. The parking assistant according to claim 7, wherein the parking data further includes information on the orientations of the other vehicles, wherein the steering instructions include instructions on parking the vehicle in reverse orientation to the at least one other vehicle.

9. The parking assistant according to claim 7, wherein the parking data further includes information on the orientations of the other vehicles, wherein the steering instructions include instructions on parking the vehicle in reverse orientation to the at least one other vehicle.

10. The parking assistant according to claim 7, wherein the sensor system is configured to acquire information on the orientations of the other vehicles by detecting structures and/or surface patterns on the other vehicles.

11. The parking assistant according to claim 7, wherein the sensor system is configured to determine at least one of an outer appearance of, a weight of, and a roll-out length of a safety belt used by the driver and/or the further occupants, based on the body dimensions determined by the telematics system.

12. The parking assistant according to claim 7, further comprising:
an assisted/autonomous driving unit configured to park the vehicle following the steering instructions.

13. A vehicle with a parking assistant according to claim 7.

14. The vehicle according to claim 13, wherein the vehicle is a motor vehicle.

* * * * *